() United States Patent  
Han

(10) Patent No.: US 8,878,405 B2  
(45) Date of Patent: Nov. 4, 2014

(54) SPINDLE MOTOR

(71) Applicant: LG Innotek Co., Ltd., Seoul (KR)

(72) Inventor: Cheongun Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/925,453

(22) Filed: Jun. 24, 2013

(65) Prior Publication Data

US 2013/0278101 A1   Oct. 24, 2013

Related U.S. Application Data

(63) Continuation of application No. 13/168,587, filed on Jun. 24, 2011, now Pat. No. 8,492,942.

(30) Foreign Application Priority Data

Jun. 25, 2010 (KR) .................. 10-2010-0060418

(51) Int. Cl.
H02K 21/00 (2006.01)
H02K 7/09 (2006.01)
G11B 19/20 (2006.01)
H02K 7/08 (2006.01)

(52) U.S. Cl.
CPC .............. *H02K 7/09* (2013.01); *G11B 19/2009* (2013.01); *H02K 7/085* (2013.01); *H02K 2205/03* (2013.01)
USPC .......................................... 310/67 R; 310/90

(58) Field of Classification Search
USPC ........................... 310/67 R, 90, 90.5
See application file for complete search history.

(56) References Cited

U.S. PATENT DOCUMENTS

| | | | |
|---|---|---|---|
| 6,982,505 B2 * | 1/2006 | Horng et al. ................. 310/51 |
| 8,330,310 B2 | 12/2012 | Kim |
| 8,492,942 B2 * | 7/2013 | Han .......................... 310/67 R |
| 2004/0007929 A1 | 1/2004 | Wakita et al. |
| 2005/0179327 A1 | 8/2005 | Horng et al. |
| 2007/0028255 A1 * | 2/2007 | Ito et al. ....................... 720/706 |
| 2007/0183698 A1 | 8/2007 | Hada |
| 2007/0277189 A1 | 11/2007 | Yasumoto et al. |
| 2007/0294712 A1 | 12/2007 | Ito et al. |
| 2009/0195118 A1 * | 8/2009 | An ........................ 310/216.135 |

FOREIGN PATENT DOCUMENTS

KR   20-2009-0007601 U   7/2009

OTHER PUBLICATIONS

Office Action dated Jan. 25, 2012 in Korean Application No. 10-2010-0060418, filed Jun. 25, 2010.

* cited by examiner

*Primary Examiner* — Dang Le
(74) *Attorney, Agent, or Firm* — Saliwanchik Lloyd & Eisenschenk

(57) ABSTRACT

A spindle motor is provided, the motor including a bearing assembly including an upper surface-opened cylindrical bearing housing and a bearing accommodated in the bearing housing and formed with a rotation shaft hole; a stator including a core coupled to a periphery of the bearing housing and a coil wound on the core; a rotation shaft inserted into the rotation shaft hole; a rotor including a disk-shaped yoke coupled to the rotation shaft and a magnet coupled to the yoke to face the core; and a suction magnet arranged at the yoke facing the core, wherein the bearing housing includes a body coupled to the core and a core fixture bent from the body to face the core, and the suction magnet is so arranged as to face the core fixture corresponding to an external side of a bent unit bent from the body for forming the core fixture.

10 Claims, 2 Drawing Sheets

SPINDLE MOTOR

CROSS-REFERENCE TO RELATED APPLICATION

This application is a continuation of U.S. patent application Ser. No. 13/168,587, filed Jun. 24, 2011, which claims the benefit under 35 U.S.C. §119 of Korean Patent Application No. 10-2010-0060418, filed Jun. 25, 2010, which are hereby incorporated by reference in their entirety.

BACKGROUND

1. Field of the Invention

The present disclosure relates to a spindle motor.

2. Description with the Related Art

Recently, an optical disk drive (ODD) has been developed that is capable of rotating a high capacity optical disk capable of recording or being recorded with data. The ODD includes a spindle motor rotating an optical disk at a high speed, and an optical pick-up module reading or recording data.

The spindle motor applied to the ODD includes a bearing housing including a bearing into which a rotation shaft is inserted, a core coupled to a periphery of the bearing housing, a yoke coupled to the rotation shaft, and a suction magnet mounted to the yoke to generate a suction force sucking the bearing housing.

The bearing housing functions to secure the rotation shaft to a predetermined position and to secure the core.

An upper surface of the bearing housing takes an outwardly-bent shape for inhibiting the core secured at a periphery of the bearing housing from being separated, whereby the bent portion of the bearing housing takes the shape of a curvature. The suction magnet according to a conventional spindle motor is disposed at a portion bent to have the curvature in the bearing housing.

In a case the suction magnet is disposed at a portion bent to have the curvature in the bearing housing, the spindle motor suffers from a disadvantage in that a suction force at the suction magnet and the portion having the curvature is unevenly formed to cause the rotation shaft to move along axis of the rotation shaft.

BRIEF SUMMARY

Exemplary embodiments of the present disclosure are to provide a spindle motor in which a bearing housing is structurally improved to inhibit a rotation shaft from moving along an axis of the rotation shaft by increasing a suction force between the bearing housing and a suction magnet, and to enhance a rotational performance and rotational stability.

Technical problems to be solved by the present disclosure are not restricted to the above-mentioned description, and any other technical problems not mentioned so far will be clearly appreciated from the following description by skilled in the art.

In one general aspect of the present disclosure, there is provided a spindle motor, the spindle motor comprising: a bearing assembly including an upper surface-opened cylindrical bearing housing and a bearing accommodated in the bearing housing and formed with a rotation shaft hole; a stator including a core coupled to a periphery of the bearing housing and a coil wound on the core; a rotation shaft inserted into the rotation shaft hole; a rotor including a disk-shaped yoke coupled to the rotation shaft and a magnet coupled to the yoke to face the core; and a suction magnet arranged at the yoke facing the core, wherein the bearing housing includes a body coupled to the core and a core fixture bent from the body to face the core, and the suction magnet is so arranged as to face the core fixture corresponding to an external side of a bent unit bent from the body for forming the core fixture.

In another general aspect of the present disclosure, there is provided a spindle motor, the spindle motor including a bearing assembly, a stator, a rotor and a suction magnet, wherein the bearing assembly includes a core fixture bent to allow a core comprising the stator to be coupled and provided in the shape of a recess of a size corresponding to that of the core.

The spindle motor according to the present disclosure has an advantageous effect in that a core is inhibited from separating by forming a core fixture at a bearing housing, and decrease or unevenness of suction force of a suction magnet between the suction magnet and the bearing housing caused by a curvature bent unit that is formed in the course of forming the core fixture can be inhibited by arranging the suction magnet on the core fixture evenly formed at an external side of the curvature bent unit.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Figure 1:
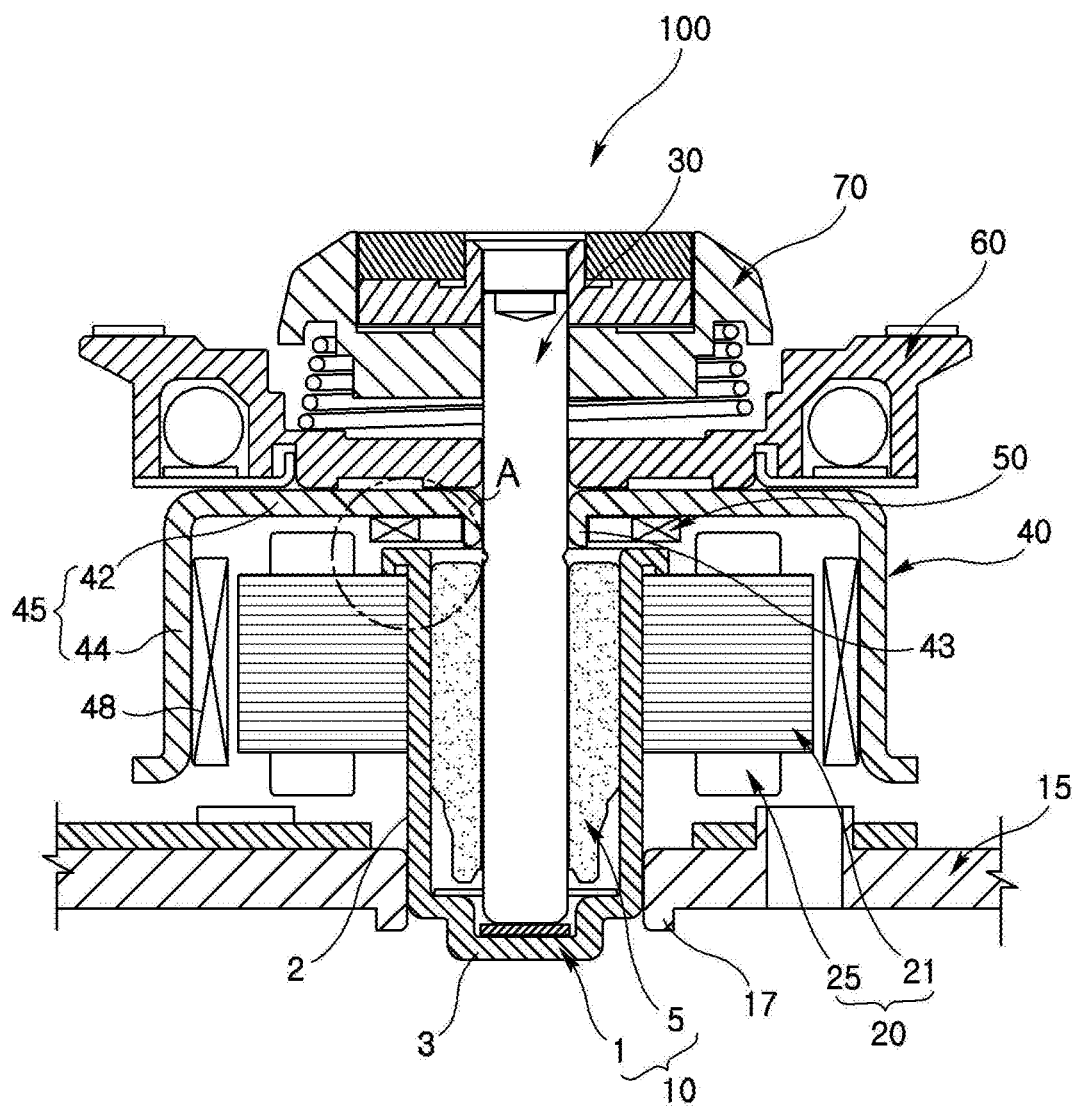
FIG. 1 is a cross-sectional view of a spindle motor according to an exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. The meaning will be clear from the context of the description. Like numbers refer to like elements throughout, and explanations that duplicate one another will be omitted.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Figure 2:
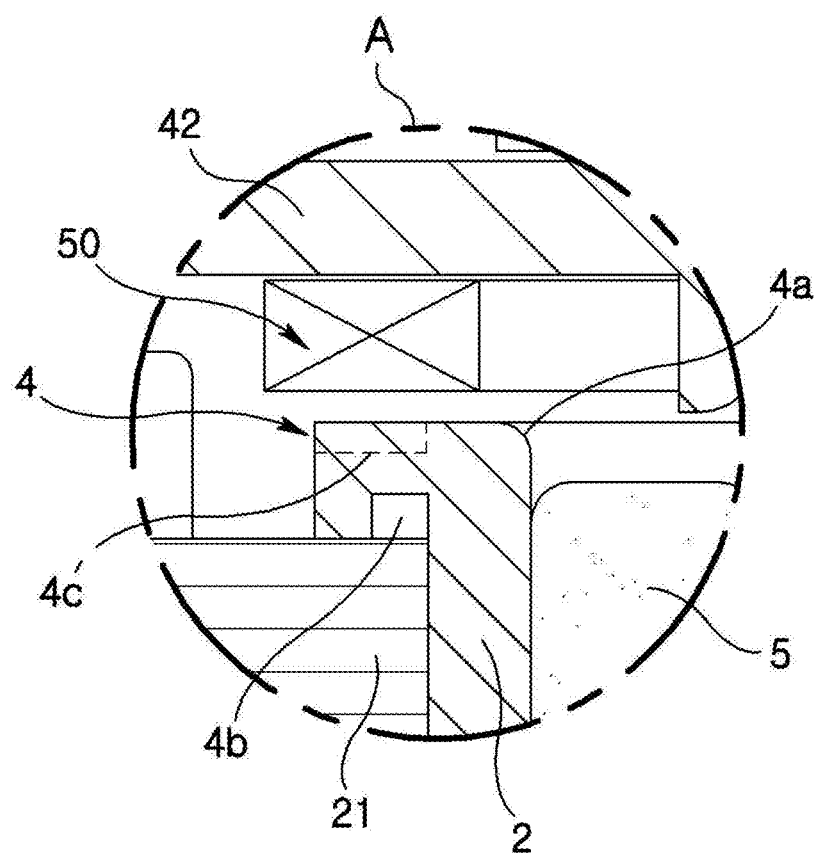
FIG. 2 is an enlarged view of 'A' portion of FIG. 1.

FIG. 1 is a cross-sectional view of a spindle motor according to an exemplary embodiment of the present disclosure, and FIG. 2 is a partially enlarged view of 'A' of FIG. 1.

Referring to FIGS. 1 and 2, a spindle motor (100) includes a bearing assembly (10) a stator (20), a rotation shaft (30), a rotor (40) and a suction magnet (50). The spindle motor (100) may further include a turn table (60), a center cone (70) and a base plate (15). The bearing assembly (10) includes a bearing housing (1) and a bearing (5). The bearing housing (1) takes the shape of an upper surface-opened cylinder, and may include a metal.

The upper surface-opened cylindrical bearing housing (1) includes a lateral plate (2), a floor plate (3), a core fixture (4) and a bent unit (4a). The lateral plate of the bearing housing (1) may take the shape of a cylinder, for example, and the floor plate (3) may be formed at a bottom distal end of the lateral plate (2). In the present exemplary embodiment, the lateral plate (2) and the floor plate (3) may be formed by a press work, for example.

An upper surface of the lateral plate (2) at the bearing housing (1) is bent to a direction facing an outside of the lateral plate (2), whereby the core fixture (4) is formed at an upper end of the lateral plate (2). In the present exemplary embodiment, the core fixture (4) may be substantially perpendicular to the lateral plate (2) of the bearing housing, for example.

The bent unit (4a) is formed in the shape of a band connecting the lateral plate (2) and the core fixture (4) by bending the lateral plate (2) of the bearing housing (1) to form the core fixture. The bent unit (4a) takes the shape of a curvature, for example, and the curvature-formed bent unit (4a) is formed in the course of forming the core fixture (4).

The core fixture (4) of the bearing housing (1) is perpendicularly formed relative to the lateral plate (2), and the bent unit (4a) connected to the core fixture (4) takes the shape of a curvature.

Meanwhile, a bottom surface meeting a periphery of the lateral plate (2) in the core fixture (4) is formed with a ring-shaped trench unit (4b). The ring-shaped trench unit (4b) inhibits an adhesive from overflowing outside of the core fixture (4) when a core (described later) is fixed to the lateral plate (2) of the bearing housing (1) via the adhesive.

Furthermore, an upper surface of the core fixture (4) may be formed with a ring-shaped sill (4c) formed at a predetermined depth. The ring-shaped sill (4c) formed at the upper surface of the core fixture (4) restricts or reduces generation of chips when the bearing housing (1) is formed through a stamping process.

The bearing (5) is accommodated in an accommodation space formed at the bearing housing (1), and takes the shape of a rotation shaft hole-formed cylinder. In the present exemplary embodiment, the bearing (5) may include an oil impregnated sintered bearing.

The bearing housing (1) of the bearing assembly (10) is coupled to a base plate (15). The base plate (15) is formed with a burring unit (17), which is in turn coupled to the lateral plate (2) of the bearing housing (1).

The stator (20) includes a core (21) and a coil (25). The core (21) is formed by stacking a plurality of iron pieces each having a thin thickness, and is centrally formed with a through hole coupled to the lateral plate (2) of the bearing housing (1). The coil (25) is wound on the core (21) and a magnetic field is generated from the coil (25) as a current is applied to the coil (25) wound on the core (21).

An upper surface of the core (21) is brought into contact with the core fixture (4) bent from the lateral plate (2) of the bearing housing (1), whereby the core (21) is inhibited from separating from an upper surface of the lateral plate (2) at the bearing housing (1).

The rotation shaft (30) is rotatably inserted into a rotation shaft hole of the bearing (5) accommodated in the bearing housing (1).

The rotor (40) includes a yoke (45) and a magnet (48). The yoke (45) takes the shape of a bottom surface-opened cylinder. To be more specific, the yoke (45) includes a yoke upper plate (42) and a yoke lateral plate (44).

The yoke upper plate (42) takes the shape of a disk having a thin thickness, and is centrally formed with a yoke burring unit (43). The yoke burring unit (43) is coupled to the rotation shaft (30), and the yoke upper plate (42) is rotated along with the rotation shaft (30) as the rotation shaft (30) is coupled to the yoke burring unit (43).

The yoke lateral plate (44) is extended from an external edge of the yoke upper plate (42) to a direction facing a bottom side.

The magnet (48) is arranged at an inner lateral surface of the yoke lateral plate (44) to face the core (21). The yoke (45) and the rotation shaft (30) are rotated by a magnetic field generated by the magnet (48) and a magnetic field generated from the coil (25) wound on the core (21).

The suction magnet (50) is arranged on a bottom surface of the yoke (45) facing the core (21) in the yoke (45), and takes the shape of a circular ring, when viewed in a top plan view.

In the present exemplary embodiment, the arrangement of the suction magnet (50) is very important. The rotation shaft (30) may vertically move along an axial direction of the rotation shaft (50) inside the bearing (5) according to arrangement of the suction magnet (50), and in a case the rotation shaft (30) vertically moves along the axial direction of the rotation shaft (50), there may occur a data reading error of an optical disk that rotates along with the rotation shaft (30).

The lift of the rotation shaft (30) may be generated when the suction magnet (50) is arranged at the bent unit (4a) of the bearing housing (1). The lift is caused by decrease or unevenness of suction force acting between the bearing housing (1) and the suction magnet (50) in a case the suction magnet (50) is arranged on the bent unit (4a).

In the present exemplary embodiment, in order to inhibit the lift of the rotation shaft (30), the suction magnet (50) is arranged at an inner lateral surface of the yoke upper plate (42) lest the suction magnet (50) should be overlapped with the bent unit (4a). To be more specific, the suction magnet (50) is arrange at a position corresponding to the core fixture (4) which is a planar surface arranged at an external side of the bent unit (4a), whereby the decrease or unevenness of suction force acting between the suction magnet (50) and the bearing housing (1) can be avoided.

Referring to FIG. 1, the turn table (60) on which an optical disk is accommodated is arranged at an upper surface of the yoke upper plate (42). A though hole is formed at a rotation center of the turn table (60), and through hole of the turn table (60) is coupled by the rotation shaft (30). The turn table (6) is rotated along with the rotation shaft (30) as the through hole of the turn table (60) is coupled to the rotation shaft (30).

The center cone (70) is inserted into the rotation shaft (30), and moves along an axial direction of the rotation shaft (30). The center cone (70) matches a rotation center of the optical disk to that of the rotation shaft (30).

As apparent from the foregoing, the spindle motor according to the present disclosure has an industrial applicability and advantageous effect in that a core is inhibited from separating by forming a core fixture at a bearing housing, and decrease or unevenness of suction force of a suction magnet between the suction magnet and the bearing housing caused by a curvature bent unit that is formed in the course of forming the core fixture can be inhibited by arranging the suction magnet on the core fixture evenly formed at an external side of the curvature bent unit.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor, comprising:
   a bearing assembly including an upper surface-opened cylindrical bearing housing, a bearing accommodated in the bearing housing, and a rotation shaft hole formed in the bearing;
   a stator including a core coupled to a periphery of the bearing housing and a coil wound on the core;
   a rotation shaft inserted into the rotation shaft hole;
   a rotor including a disk-shaped yoke coupled to the rotation shaft and a magnet coupled to the yoke to face the core; and
   a suction magnet arranged at the yoke facing the core;
   wherein the bearing housing includes a body coupled to the core and a core fixture bent to a direction facing an outside of the body to face the core,
   wherein the core fixture includes a first portion vertically bent from the body, a second portion vertically bent from the first portion, and a ring-shaped sill formed at an upper surface of the first portion of the core fixture adjacent to the second portion of the core fixture; and
   wherein the suction magnet faces the first portion of the core fixture.

2. The spindle motor of claim 1, wherein a ring-shaped trench unit is formed in the bottom surface of the core fixture.

3. The spindle motor of claim 1, wherein a bent portion is formed between the body and the first portion of the core fixture and is formed with a curvature.

4. A spindle motor, comprising:
   a bearing assembly, a stator, a rotor, and a suction magnet;
   wherein the bearing assembly includes
   an upper surface-opened cylindrical bearing housing including a body coupled to a core and a core fixture bent to a direction facing an outside of the body to face the core, a bearing accommodated in the bearing housing, and a rotation shaft hole formed in the bearing; and
   wherein the core fixture includes a first portion vertically bent from the body, a second portion vertically bent from the first portion, and a ring-shaped sill formed at an upper surface of the first portion of the core fixture adjacent to the second portion of the core fixture.

5. The spindle motor of claim 4, wherein the rotor includes a rotation shaft inserted into the rotation shaft hole, a disk-shaped yoke coupled to the rotation shaft and a magnet coupled to the yoke to face the core.

6. The spindle motor of claim 5, wherein the suction magnet is arranged at the yoke facing the core.

7. The spindle motor of claim 6, wherein the suction magnet is arranged at a position facing the core fixture.

8. The spindle motor of claim 7, wherein the stator includes a core coupled to a periphery of the bearing housing and a coil wound on the core.

9. The spindle motor of claim 4, wherein a ring-shaped trench unit is formed in the bottom surface of the core fixture.

10. The spindle motor of claim 9, wherein a bent unit is formed at a portion in which the first portion of the core fixture is bent from the body, and is formed with a curvature having a predetermined radius of curvature.

* * * * *